United States Patent [19]
Yoneyama et al.

[11] Patent Number: 5,555,442
[45] Date of Patent: Sep. 10, 1996

[54] ERROR DETECTING DEVICE FOR A RADIO BLIND ZONE SYSTEM

[75] Inventors: Yuzo Yoneyama, Tokyo; Atsushi Inahashi, Saitama, both of Japan

[73] Assignee: NEC Corporation, Japan

[21] Appl. No.: 246,740

[22] Filed: May 20, 1994

[30] Foreign Application Priority Data

May 21, 1993 [JP] Japan ................................ 5-118878

[51] Int. Cl.⁶ .................................................. H04B 17/02
[52] U.S. Cl. ........................ 455/9; 455/14; 455/67.1; 455/115; 330/2; 330/298
[58] Field of Search ................... 455/9, 8, 13.4, 455/14, 67.1, 67.3, 88, 115, 117, 127, 3.2, 6.1; 330/2, 298, 207 P, 124 D; 375/224, 228, 213

[56] References Cited

U.S. PATENT DOCUMENTS

| | | | |
|---|---|---|---|
| 3,210,671 | 10/1965 | Lofting | 330/2 |
| 3,312,791 | 4/1967 | Markl et al. | 455/67.1 |
| 3,370,134 | 2/1968 | Johannesson et al. | 455/9 |
| 4,006,320 | 2/1977 | Markl | 330/2 |
| 4,644,288 | 2/1987 | Stanley | 330/2 |
| 4,878,034 | 10/1989 | Gross et al. | 330/207 P |

*Primary Examiner*—Reinhard J. Eisenzopf
*Assistant Examiner*—Nguyen Vo
*Attorney, Agent, or Firm*—Ostrolenk, Faber, Gerb & Soffen, LLP

[57] ABSTRACT

In a radio blind zone system, a master unit and a slave unit are respectively situated at an existing station and a radio blind zone and connected together by a coaxial transmission path. The master unit feeds a load current to the slave unit which includes a relay amplifying device or a tower-top amplifying device. The master unit is capable of detecting an error occurred in the slave unit by detecting a change in the load current applied to the slave unit.

7 Claims, 6 Drawing Sheets

ERROR DETECTING DEVICE FOR A RADIO BLIND ZONE SYSTEM

BACKGROUND OF THE INVENTION

The present invention relates to a radio blind zone system having a master unit situated at an existing zone, a slave unit located at a radio signal blind zone, and a coaxial transmission path connecting the two units, the master unit feeding a load current to the slave unit. More particularly, the present invention is concerned with a device which allows the master unit to detect an error occurred in the slave unit on the basis of a change in the load current.

A conventional radio blind tone system of the kind described has a master unit, a slave unit including a relay amplifying device, a coaxial transmission path connecting the master and slave units, and an antenna. The master unit includes a radio signal input/output terminal, and a power source which feeds a DC current for driving the slave unit. A slave error detector monitors the load current of the slave unit and outputs, when it exceeds a predetermined threshold, an alarm signal. A mixer receives a radio signal and source current, superposes them on each other, and produces the resulting composite signal. The slave unit includes a separator to which the composite signal from the mixer is sent over the coaxial path The separator separates the original radio signal and source current included in the composite signal. Three transistors constitute a tristage amplifier circuit and receive the separated source current and the radio signal as a source current and an input, respectively. An exclusive terminal is connected to the antenna. The system having such a configuration is selectively applicable to radio relay transmission or a radio relay reception, as desired.

The three transistors of the slave unit have operation currents, under normal conditions, which are different from each other. Errors particular to the transistors include unusual oscillation and breakdown. Unusual oscillation causes the load currents of the transistors to increase while breakdown causes them to decrease. The master unit, feeding the source current to the slave unit, can constantly detect such changes in the load currents of the transistors. More specifically, the error detector of the master unit is responsive to changes in the load currents.

However, the conventional error detecting device described above has some problems yet to be solved, as follows. To begin with, when the first transistor, for example, is faulty, the resulting change in the small load current is too small, compared to the load current of the entire slave unit, to be detected as a change in load. Further, it is likely that an unusual change in the current of any one of the transistors is cancelled by a change in the current of another transistor attributable to a temperature change or is susceptible to noise. Under this condition, it is extremely difficult to detect an error occurred in the slave unit accurately.

SUMMARY OF THE INVENTION

It is, therefore, an object of the present invention to provide a simple error detecting device included in a radio blind zone system for allowing a master unit to detect the error of a slave unit accurately by detecting the errors of individual transistors built in the slave unit, i.e., by reducing the influence of changes attributable to temperature and changes in load as well as the influence of noise.

In accordance with the present invention, in a radio blind zone system comprising a slave unit located in a signal blind zone and including at least one of a relay amplifying device and a tower-top amplifying device which amplify a radio signal, and a master unit situated at an existing station and connected to the slave unit by a coaxial transmission path for feeding a source current and radio signal to the slave unit, a device for detecting an error occurred in the load current of the slave unit comprises an error detector for detecting the operation voltages of a plurality of transistors, which constitute an amplifying section included in at least one of the relay amplifying device and tower-top amplifying device, and generating error signals respectively associated with the transistors, a false fluctuation current generator for generating a false fluctuation current which changes intentionally the load current of the slave unit, as seen from the master unit, to below a predetermined lower limit or to above a predetermined upper limit, and a determining section for causing the master unit to recognize an error occurred in the slave unit via the coaxial transmission path on the basis of the false fluctuation current.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 6:
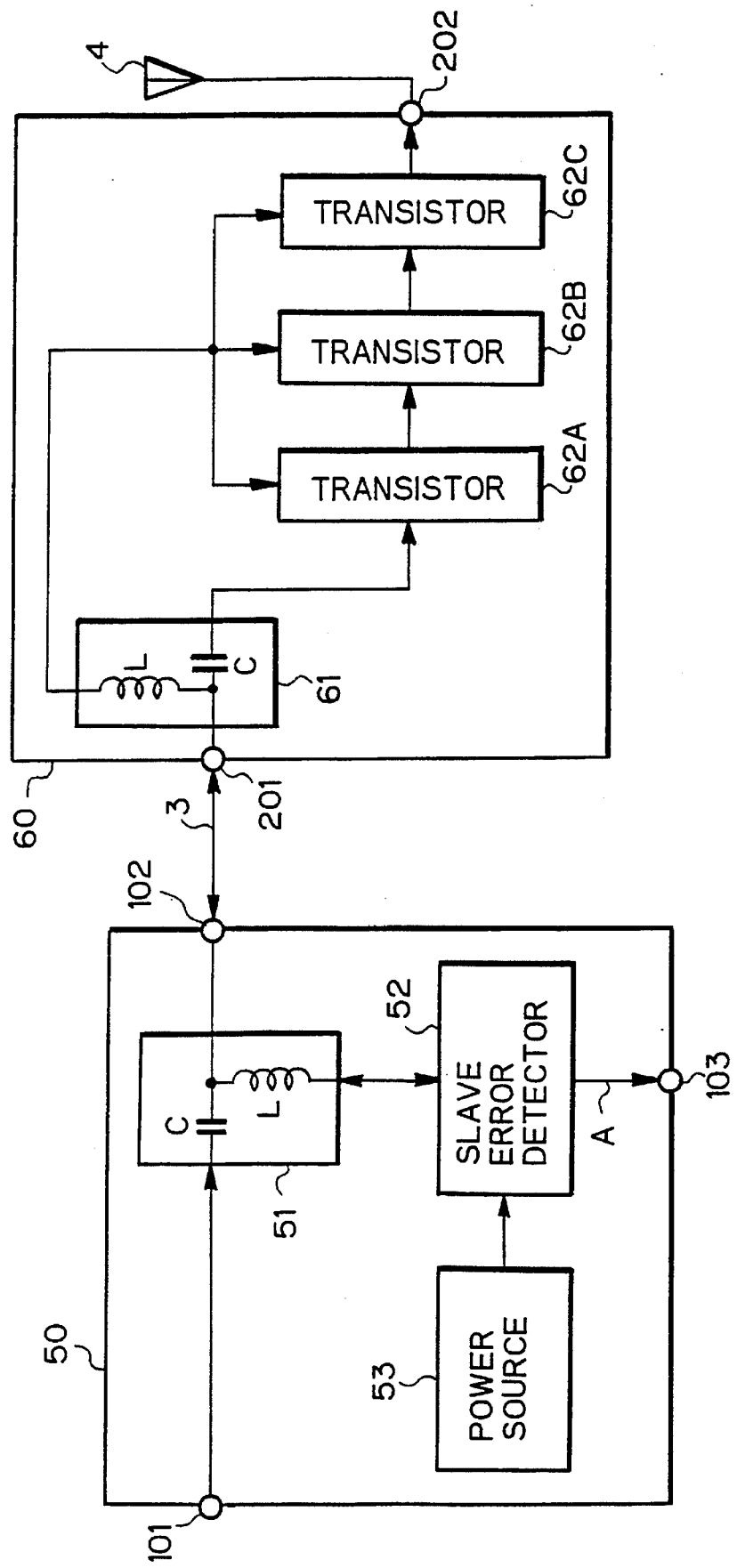
FIG. 6 is a block diagram schematically showing a conventional alarm detecting device.

To better understand the present invention, a brief reference will be made to a conventional error detecting device for a radio blind zone system, shown in FIG. 6. As shown, the device is made tap of a master unit 50, a slave unit 60 including a relay amplifying device, a coaxial transmission path 3 connecting the two units 50 and 60, and an antenna 4.

The master unit 50 includes a radio signal input/output terminal 101, and a power source 53 which feeds a DC current for driving the slave unit 60. A slave error detector 52 monitors the load current of the slave unit 60 and outputs, when it exceeds a predetermined threshold, an alarm signal A via a terminal 103. A mixer 51 receives a radio signal from the terminal 101 and receives the source current via the slave error detector 52, superposes them on each other, and produces the resulting composite signal on an output 102. The slave unit 60, implemented by a relay amplifying device, includes a separator 61 to which the composite signal from the mixer 51 is sent over the coaxial path 3. The separator 61 separates the original radio signal and source current included in the composite signal. Three transistors 62A, 62B and 62C constitute a tristage amplifier circuit and receive the separated source current and the radio signal as a source current and an input, respectively. A terminal 202 is connected to the antenna 4. It is to be noted that the system shown in FIG. 6 is applicable to radio relay transmission or radio relay reception, as desired.

In the master unit 50, the mixer 51 has a high frequency choke coil L and a DC'' obstructing capacitor C. A radio signal received from an existing host station via the terminal 101 is routed through the DC blocking capacitor C and terminal 102 to the coaxial path 3. At the same time, the source current from the power source 53 is routed through the error detector 52, high frequency choke coil L and terminal 102 to the coaxial path 3. In the slave unit 50, the separator 61 is identical with the mixer 51 of the mater unit 50 except that the constituent parts thereof are connected in the opposite configuration with respect to input and output. The source current, or DC component, separated from the radio signal is applied to the transistors 62A–62C via the choke coil L, while the radio signal is fed to the first transistor 62A as an input via the capacitor C. The mixer 51 and separator 61 are each capable of producing the composite signal or separating it reversibly.

The transistors 62A, 62B and 62C of the slave unit 60 have operation currents, under normal conditions, which are different from each other, e.g., 5 mA, 100 mA and 500 mA, respectively. Errors particular to the transistors 62A–62C include unusual oscillation and breakdown. Unusual oscillation causes the load currents of the transistors 62A–62C to increase while breakdown causes them to decrease. The master unit 50, feeding the source current to the slave unit 60 over the path 3, can constantly detect such changes in the load currents of the transistors 62A–62C. More specifically, the error detector 52 of the master unit 50 is responsive to changes in the load currents.

A problem with the conventional error detecting device is that when the first transistor 62A, for example, is faulty, the resulting change in the small load current is too small, compared to the load current of the entire slave unit 60, to be detected as a change in load, as discussed earlier. Further, it is likely that an unusual change in the current of any one of the transistors 61A–62C is cancelled by a change in the current of another transistor attributable to a temperature change or is susceptible to noise. Under this condition, it is extremely difficult to detect an error occurred in the slave unit 60 accurately.

Figure 1:
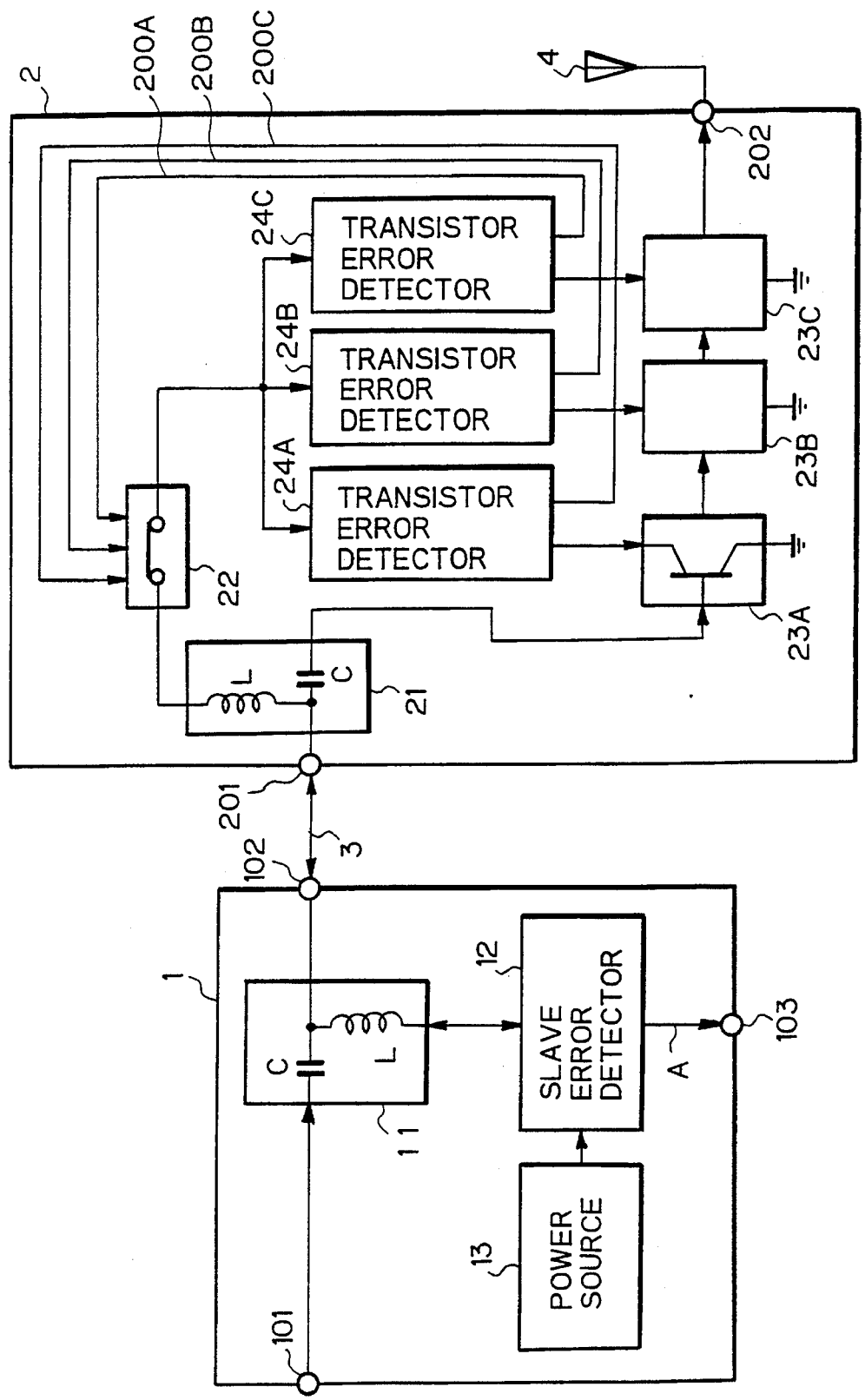
FIG. 1 is a block diagram schematically showing a first embodiment of the error detecting device in accordance with the present invention.

Referring to FIG. 1, a first embodiment of the error detecting device in accordance with the present invention is shown. As shown, the device has a master unit 1, a slave unit 2 having a radio relaying device, a coaxial transmission path 3 connecting the two units 1 and 2, and an antenna 4. Let the following description concentrate on radio relay transmission, as distinguished from radio relay reception, by way of example.

Figure 2:
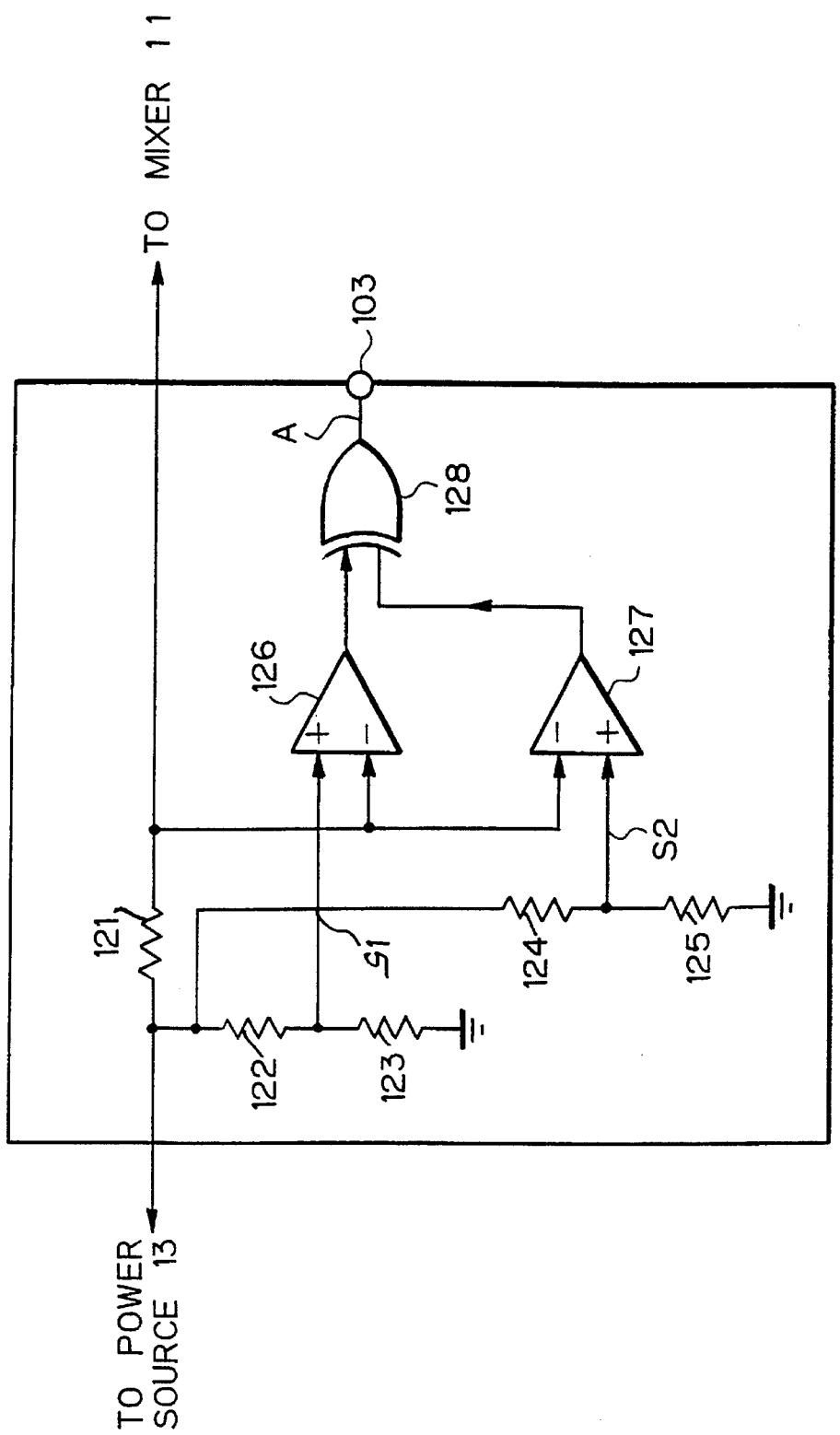
FIG. 2 shows a specific construction of a slave error detector included in the embodiment.

The master unit 1 includes a mixer 11 for superposing a radio signal received from an existing host station via an input 101 and a source current fed from a power source 13 via a slave error detector 12. The slave error detector 12 detects the error of the slave unit, or load, 2 by comparing a load current resulting from the source current of the power source 13 with predetermined upper and lower limits. As shown in FIG. 2 specifically, the error detector 12 includes two comparators 126 and 127, an OR gate 128, and resistors 121, 122, 123, 124 and 125. A load current to be fed to the slave unit 2 via the mixer 11 flows through the resistor 121. Two different reference voltages S1 and S2 are produced from the voltage of the power source 13 and respectively applied to the comparators 126 and 127 as thresholds for error detection. Specifically, the reference voltages S1 and S2 respectively define the upper and lower limits of the load current. The comparators 126 and 127 output, when the load current is greater the upper limit and smaller than the lower limit, respectively, a logical ONE. As a result, an alarm signal A appears on the output of the OR gate 128, indicating that the slave unit 2 is faulty.

Referring again to FIG. 1, the, slave unit 2 includes a separator 21, and transistors 23A, 23B and 23C constituting a tristage transistor circuit. Transistor error detectors 24A, 24B and 24C are respectively connected to the transistors 23A, 23B and 23C in order to detect errors occurred therein. A false fluctuation current generator 22 generates, when at least one of the transistors 23A–23C has failed, a false fluctuation current which allows the master unit 1 to recognize the failure in the form of a load current lower than the lower limit.

In operation, a radio signal from an existing host station is input to the master unit 1 via the terminal 101, mixed with the source current from the power source 13, and then output via the terminal 102. The slave error detector 12 monitors the load current of the slave unit 2 which is driven by the power source 13. On detecting an unusual load current, the error detector 12 generates an alarm signal A. The output of the master unit 1 is fed to the slave unit 3, which is situated in a radio blind zone, over the coaxial path 3 and terminal 201. In the slave unit 2, the separator 21 separates the source current and radio signal included in the output of the master unit 1. The radio signal is applied to the first transistor 23A of the tristage transistor circuit, sequentially amplified by the amplifies 23B and 23C, and then sent out via the terminal 202 and antenna 4. On the other hand, the source current output from the separator 21 is routed through the false fluctuation current generator 22 and transistor error detectors 24A–24C to the transistors 23A–23C. The transistor error detectors 24A–24C include the collector resistances of the transistors 23A–23C, respectively, as will be described later specifically.

Figure 3:
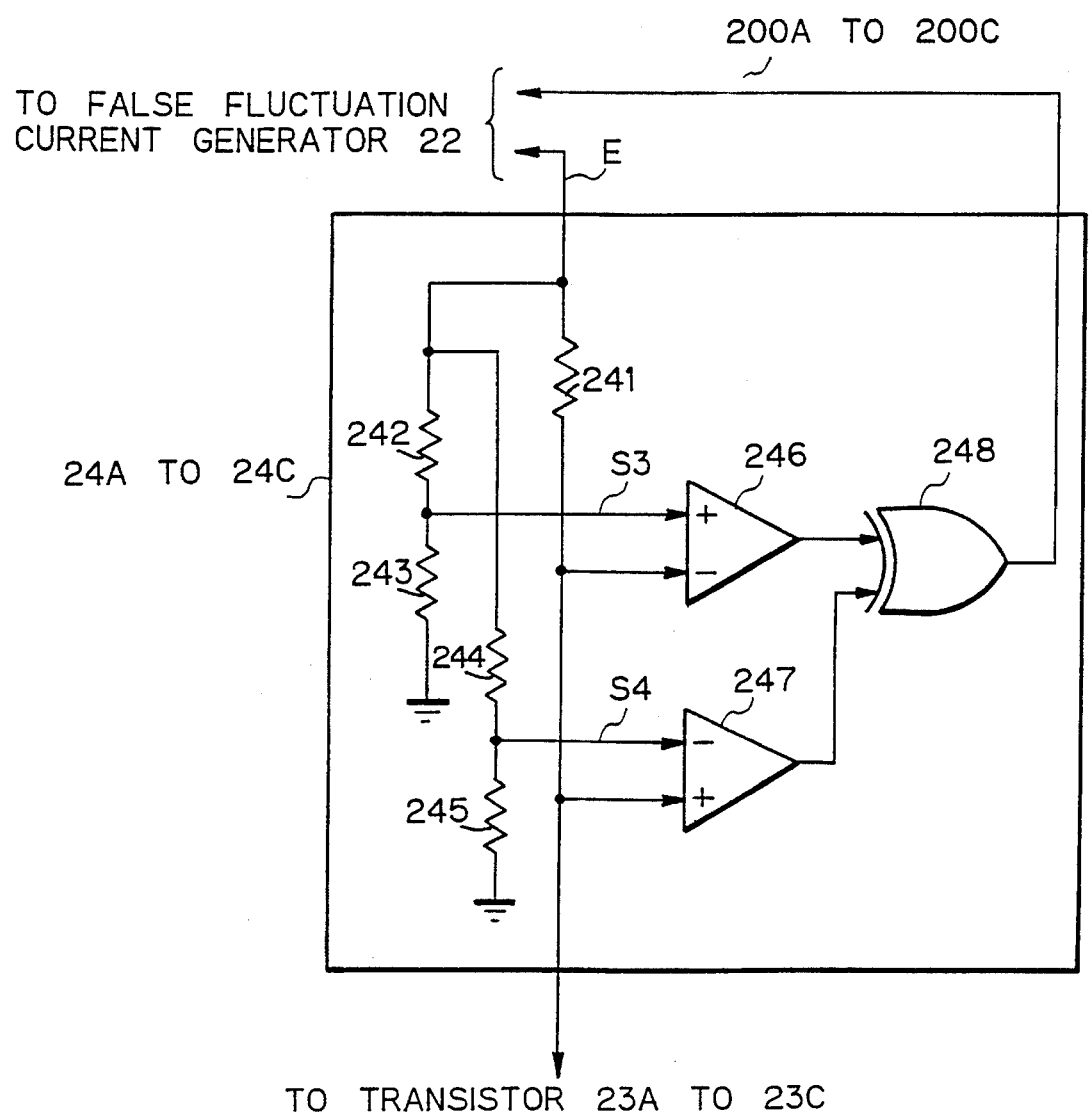
FIG. 3 shows a specific construction of a transistor error detector also included in the embodiment.

Errors in the operation currents of the transistors 23A–23C can be respectively detected in terms of fluctuations in their collector voltages. FIG. 3 shows a specific construction of each of the transistor error detectors 24A–24C. With the transistor error detectors 24A–24C, it is possible to effect a far more efficient transistor error detection than conventional.

Specifically, as shown in FIG. 3, the transistor error detectors 24A–24C each comprises resistors 241, 242, 243, 244 and 245, comparators 246 and 2,47, and an OR gate 248. The resistor 241 is implemented by the collector of the transistor 23. The resistors 242 and 243 cooperate to produce a reference voltage S3, defining an upper limit, from a source current E fed from the false fluctuation current generator 22. The resistors 244 and 245 produce a reference voltage S4 which defines a lower limit. The reference voltages S3 and S4 differ from one transistor to another, i.e., from one error detector to another and matches the operation current of the latter. A voltage corresponding to the operation current of the transistor 23 appears across the collector resistance 241 of the transistor 23. This voltage is compared with the reference voltages S3 and S4 by the comparators 246 and 247, respectively. If the operation current is excessive or short, an error signal 200A, 200B or 200C is delivered from the OR gate 248 to associated one of the error detectors 24A–24C.

The false fluctuation current generator 22 includes a switch therein and opens it when at least one of the error signals 200A–200C arrives thereat. As a result, the current supply from the separator 21 is shut off. It is necessary that the total operation current to be shut off, i.e., the false fluctuation current to be intentionally generated by the load current as a fluctuation current, as seen from the master 1 side, satisfies the following relation:

(absolute value of false fluctuation current intentionally changed) > (sum of temperature-dependent changes in operation currents and changes in loads of all transistors) + (noise margin)  (1)

As the above relation (1) indicates, the absolute value of the load current to be shut off, i.e., the increment or decrement in the load current to be intentionally reported to the master unit 1 via the coaxial path 3 as a false fluctuation current overcomes the influence of the changes in the operation currents due to temperature and the changes in the loads of all the transistors 23A–23C, as well as the influence of noise.

Assume that the operation currents of the transistors 23A–23C are 5 mA, 100 mA and 500 mA, respectively, that the total load current of the slave unit 2 set in the slave error detector 12 of the master unit 1 is 1 A as a center, and that fluctuation width is 0.3 A. Then, the upper limit and the lower limit for the detection of an unusual load current are 1.3 A and 0.7 A, respectively. It follows that the master unit 1 can surely detect an error occurred in the slave unit 2 if the load current is changed in a positive amount or a negative amount greater than 0.3 A (300 mA). This can be done since the false fluctuation current generator 22 shuts off the source current in response to at least one of the error signals 200A–200C.

As stated above, despite that the operation current of the first transistor 23A is as small as 5 mA, the error thereof can be detected as accurately as the error of the last transistor 23C whose operation current is 500 mA and, in addition, without being affected by changes attributable to temperature, changes in load, or noise.

Figure 4:
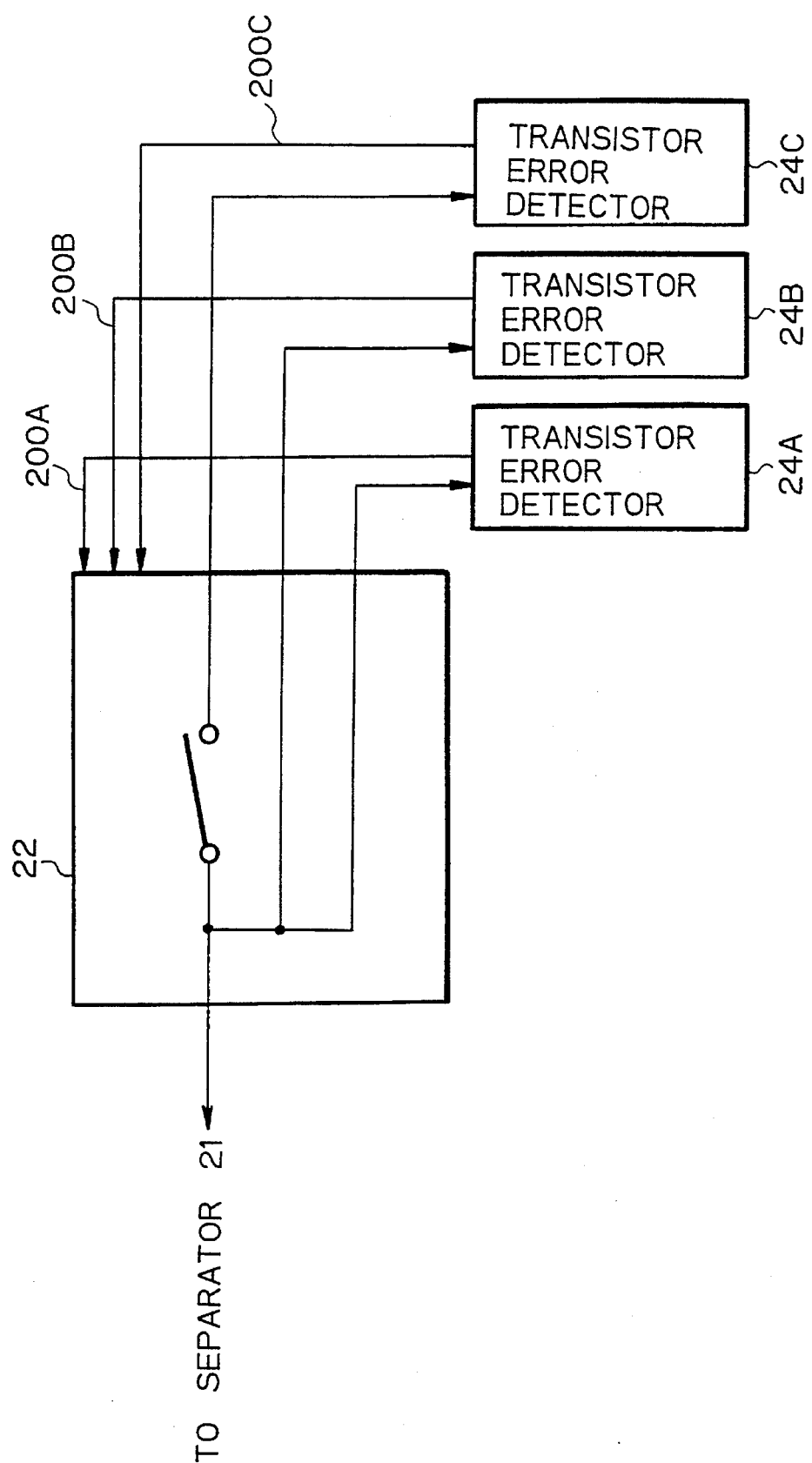
FIGS. 4 and 5 are schematic block diagrams respectively showing a second and a third embodiment of the present invention.

Referring to FIG. 4, a second embodiment of the present invention is shown in a fragmentary schematic block diagram. The part of this embodiment not shown in FIG. 4 is identical with the configuration of FIG. 1 and will not be described in order to avoid redundancy. As shown, the embodiment interrupts only the source current to the transistor error detector 24C whose operation current is greatest. This is based on the fact that if the operation current of the transistor 23C is 500 mA, as stated earlier, interrupting only the source current to the error detector 24C in response to the error signals 200A–200C suffices.

Figure 5:
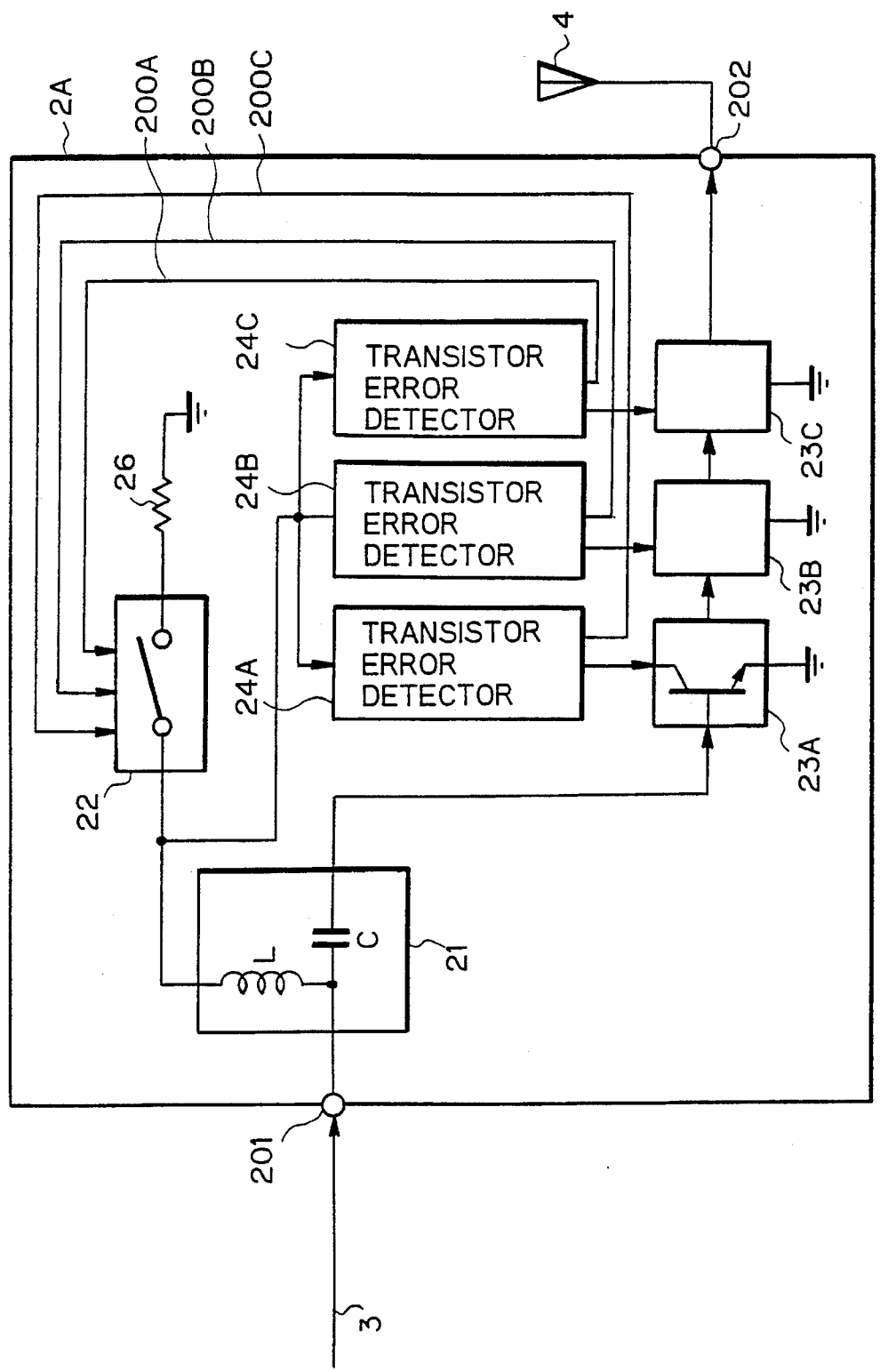

FIG. 5 shows a slave unit 2A representative of a third embodiment of the present invention. The master unit 1 shown in FIG. 1 is applicable to the slave unit 2A and, therefore, will not be shown or described. As shown, the slave unit 2A includes a dummy load 26 having a low resistance and connected to the false fluctuation current generator 22. When at least one of the error signals 200A–200C arrives at the current generator 22, the switch built therein is closed to connect the dummy load 26 to the source current. In this configuration, the source current and dummy load 26 produce a false fluctuation current greater than a predetermined upper limit. As a result, the master unit 1 detects the error occurred in the transistors of the slave unit 2A. Again, the resistance of the dummy load 26 should satisfy the previously stated relation (1).

In summary, an error detecting device of the present invention can surely detect the errors of individual transistors built in a slave unit while taking account of changes in temperature changes in load, and noise. Specifically, a relay amplifying device, tower-top amplifying device or similar slave unit located in a radio blind zone and needing remote monitoring has transistors in an amplifying section thereof. The error detecting device monitors such transistors based on their collector voltages and increases or decreases, when the load current of at least one of the transistors is unusual, the load current of the entire slave unit intentionally. This allows a simple master unit to operate with apparent accuracy of up to several milliamperes level.

Various modifications will become possible for those skilled in the art after receiving the teachings of the present disclosure without depart from the scope thereof.

What is claimed is:

1. In a radio blind zone system including a slave unit located in a radio signal blind zone and including at least one of a relay amplifying device and a tower-top amplifying device which amplify a radio signal, and a master unit situated at an existing station and connected to said slave unit by a coaxial transmission path for feeding a source current and said radio signal to said slave unit;

a device for detecting an error in a load current of said slave unit, comprising:
 error detecting means detecting operation voltages of a plurality of transistors, which constitute an amplifying section included in at least one of said relay amplifying device and said tower-top amplifying device, and generating error signals respectively associated with said plurality of transistors;
 false fluctuation current generating means located in said slave unit, said false fluctuation current generating means generating a false fluctuation current which changes intentionally the load current of said slave unit, as seen from said master unit, to below a predetermined lower limit or to above a predetermined upper limit; and
 determining means locating in said master unit, said determining means causing said master unit to recognize an error occurred in said slave unit via said coaxial transmission path on the basis of said false fluctuation current.

2. A system as claimed in claim 1, wherein said error detecting means generates said error signals by comparing the operation currents of said plurality of transistors, which are different from each other, with respective lower limits or respective upper limits.

3. A system as claimed in claim 1, wherein said false fluctuation current satisfies a false fluctuation current setting condition which exceeds a sum of changes in the operation currents of said plurality of transistors due to temperature, changes in loads of said plurality of transistors, and a noise margin.

4. A system as claimed in claim 3, wherein when the operation current of any one of said plurality of transistors satisfies said false fluctuation current setting condition, said false fluctuation current generating means generates said false fluctuation current associated only with the one transistor.

5. A device as claimed in claim 1, wherein said master unit comprises:

mixing means superposing the radio signal fed from a host included in said existing station and said source current to thereby send said radio signal and said source current to said coaxial communication path;
 power source means supplying said source current; and
 slave error detecting means detecting an error which occurred in said slave unit by detecting said load current derived from said source current to be fed to said mixing means and comparing said load current with said predetermined upper limit and said predetermined lower limit;

said slave unit comprising:
  separating means separating said radio signal and said source current received from said mixing means over said coaxial transmission path;
  said plurality of transistors connected in series for sequentially amplifying said radio signal separated by said separating means;
  a plurality of transistor error detecting means respectively associated with said plurality of transistors for determining whether or not the respective transistors are normal, and if said respective transistors are not normal, outputting said error signals; and
  said false fluctuation current generating means causing, in response to said error signals, said load current to generate said false fluctuation current by interrupting said source current, separated by said separating means, or applying a low resistance dummy load to said source current.

6. In a radio blind zone system including a slave unit located in a radio signal blind zone and including at least one of a relay amplifying device and a tower-top amplifying device which amplify a radio signal, and a master unit situated at an existing station and connected to said slave unit by a coaxial transmission path for feeding a source current and said radio signal to said slave unit;
  a device for detecting an error in a load current of said slave unit, comprising:
    error detecting means detecting operation voltages of a plurality of transistors, which constitute an amplifying section included in at least one of said relay amplifying device and said tower-top amplifying device, and generating error signals respectively associated with said plurality of transistors;
    false fluctuation current generating means located in said slave unit, said false fluctuation current generating means generating a false fluctuation current which changes intentionally the load current of said slave unit, as seen from said master unit, to below a predetermined lower limit or to above a predetermined upper limit; and
    determining means locating in said master unit, said determining means causing said master unit to recognize an error occurred in said slave unit via said coaxial transmission path on the basis of said false fluctuation current;
    wherein said false fluctuation current satisfies a false fluctuation current setting condition which exceeds a sum of changes in the operation currents of said plurality of transistors due to temperature, changes in loads of said plurality of transistors, and a noise margin.

7. A system as claimed in claim 6, wherein when the operation current of any one of said plurality of transistors satisfies said false fluctuation current setting condition, said false fluctuation current generating means generates said false fluctuation current associated only with the one transistor.

\* \* \* \* \*